Figure 1:
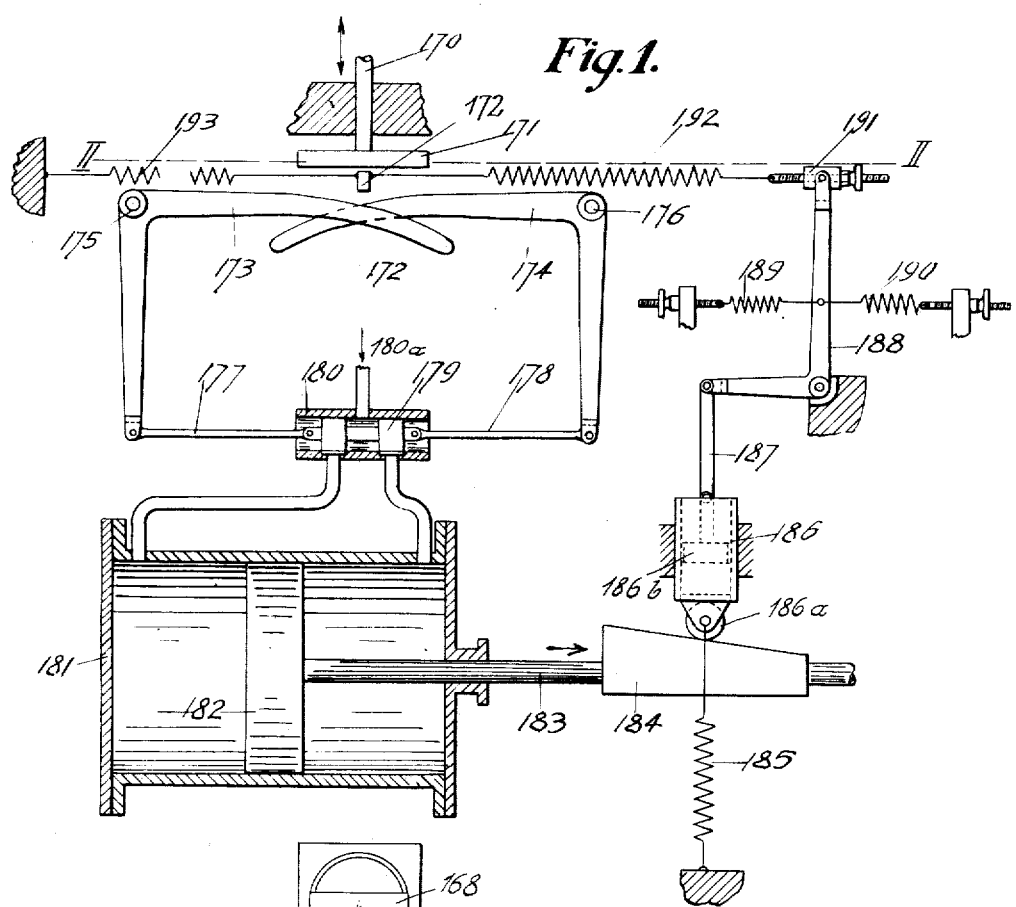

Nov. 11, 1924.

E. ROUCKA

AUTOMATIC REGULATOR

Filed Jan. 2, 1923

1,515,173

INVENTOR
Erich Roucka,
BY
Everett H. Rook,
ATTORNEYS.

Patented Nov. 11, 1924.

1,515,173

UNITED STATES PATENT OFFICE.

ERICH ROUCKA, OF BLANSKO, CZECHOSLOVAKIA.

AUTOMATIC REGULATOR.

Application filed January 2, 1923. Serial No. 610,384.

*To all whom it may concern:*

Be it known that I, ERICH ROUCKA, a citizen of the Republic of Czechoslovakia, and a resident of Blansko, Czechoslovakia, have invented new and useful Improvements in Automatic Regulators, of which the following is a specification.

This invention relates in general to automatic regulators and to measuring systems of the balanced or compensating principle for controlling or measuring any quantities or qualities, physical or chemical, by means of auxiliary energy. More particularly the invention relates to mechanism similar to that described in my co-pending applications Serial No. 455,972 and Serial No. 594,409, filed March 26, 1921 and October 13, 1922, respectively, for controlling said auxiliary energy in accordance with the position of a member movable by a means sensitive to variations in a quantity or quality.

Such a regulator or measuring system includes a member movable in accordance with variations in the quantity or quality, or another quantity or quality in accordance with variations in the first-mentioned quality or quantity, a device actuated by auxiliary energy for controlling said quantity or quality, a governor mechanism for said auxiliary energy actuated device, and a periodically actuated means to cooperate with said movable member for actuating said governor mechanism.

The primary object of the invention is to provide such a regulator or measuring system in which the auxiliary energy operates continuously or in continuous impulses instead of periodically or intermittently as described in my above mentioned co-pending applications and the intensity or extent of the action of said auxiliary energy varies according to the position of said member movable in accordance with variations in the quantity or quality. In other words, the regulator or measuring system embodies means whereby the auxiliary energy begins its action immediately upon the beginning of a variation in the quantity or quality controlling the same and continuously and progressively operates in accordance with said variation, the amount or force of said energy or the extent of operation thereof being a function of said variation; in contrast to successive or periodic operations all of the same force or extent, the variation in the quantity or quality controlling only the time and direction of the operation, and the influence of the auxiliary energy ceasing after each movement of the periodically actuated means.

A further object is to provide in such a regulator means for preventing overthrowing or hunting thereof to ensure accuracy in the operation of the regulator.

The periodically actuated means and the governing mechanism may be operated with mechanical, fluid, or electrical means, or by a combination of two or more of said means. The auxiliary energy may be of any suitable type and may operate continuously, or interruptedly, as with a step by step motor regulated by control of the number of steps per unit of time.

Figure 2:
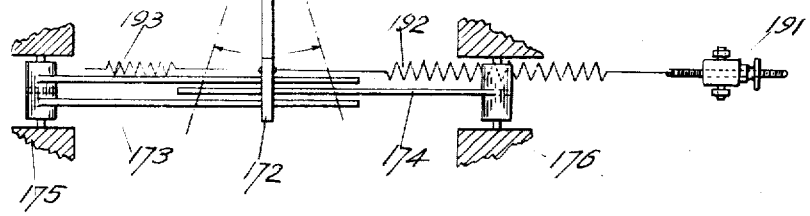

Referring to the accompanying drawings in which like numerals of reference indicate the same parts throughout the several views, Figure 1 is a diagrammatic illustration of a device embodying my invention, and Figure 2 is a partial plan view thereof taken on the line 2—2 of Fig. 1.

In the embodiment of the invention shown on the drawings, the reference character 172 indicates a member adapted to be actuated in a horizontal plane by a device 168 sensitive to variations in a physical or chemical quantity or quality, the said member being connected to the device 168 by a flexible strip 169 so as to be capable of movement in vertical planes under the influence of a periodically actuated member 171. The member 171 is adapted to be reciprocated as indicated by the arrows in Figure 1 so as to produce cooperation of the movable member 172 with a governing mechanism for controlling a motor 181 actuated by auxiliary energy. In the present instance the member 171 is shown as connected to a rod 170 reciprocable in a fixed support and adapted to be connected to any suitable actuating means.

The governing mechanism for the motor 181 comprises a pair of bell crank levers 173 pivotally mounted in a fixed support on a shaft 175 and a similar bell crank lever 174 arranged in reversed relation and pivotally mounted on a shaft 176 with one arm arranged between the arms of the bell crank lever 173. One arm of each of the levers 173 and 174 is disposed in substantially a horizontal position beneath the movable member 172 with its end overlapping and curved away from the said member. The other arms of the bell crank levers 173 and 174 are connected by the respective links 177 and 178 to opposite ends of a governor valve piston 179 mounted in a cylinder 180. The said governor valve is adapted to control the flow of fluid to and from opposite sides of the piston 182 of the motor 181.

The piston 182 is provided with a rod 183 adapted to be connected with the device to be regulated and carrying a cam block 184 which is engaged by a roller 186$^a$ of a dashpot 186 having a piston 186$^b$ arranged therein and connected by a link 187 to one arm of a bell crank lever 188, the other arm of which is connected through an adjusting screw mechanism 191 to one end of a tension spring 192, the opposite end of which is connected to the movable member 172. Another tension spring 193 opposing the spring 192 has one end connected to the movable member 172 and the other connected to a suitable fixed support. The said springs 192 and 193 balance the movable member 172 and tend to return the same to its normal or neutral position after each movement thereof. The roller 186$^a$ is influenced into engagement with the cam block 184 by a spring 185, and the bell crank lever 188 is balanced by opposed tension springs 189 and 190 connected between one arm of said lever and suitable fixed supports.

In the operation of the system, the member 171 is periodically actuated into engagement with the movable member 172 so as to force the latter into engagement with the levers 173 and 174. When the member 172 is in its neutral position equidistantly spaced from the free ends of the levers 173 and 174, actuation of said member into engagement with the said levers exerts an equal force simultaneously upon each of the levers 173 and 174 so that the valve piston 179 remains in its neutral and closed position. When the movable member 172 is actuated by the device 168 in one direction or the other, the said movable member when actuated by the member 171 engages one of the levers 173 or 174 in advance of the other so as to move the valve piston 179 in one direction. Fluid from a supply pipe 180$^a$ is then supplied to one side of the piston 182 and released from the other side. The said piston is thus moved in one direction, and actuates the mechanism to which it is connected and which it controls, for instance, an electric rheostat, electrodes of an electric furnace, etc. It will be observed that the intensity or extent of action of the fluid in the motor 181 will be varied in accordance with the position of the member 172. That is, the nearer the member 172 moves forward either of the shafts 175 or 176 the greater will be the amount of fluid admitted to the motor 181. The fluid continues to influence the piston 182 while the movable member is so located, and upon further movement of said movable member more fluid is admitted progressively to the cylinder in amounts in accordance with and as functions of the extent of movement of said movable member. After the movable member 172 has been actuated in one direction, it will be observed that when it is returned to its neutral position or is actuated in the other direction the levers 173 and 174 are returned to their neutral position or actuated to move the valve piston 179 in a direction opposite to that above described. The operation of the fluid in the motor is also continuous, that is, the piston 182 is constantly influenced by the fluid irrespective of the periodical actuations of the member 172. The action of the fluid is thus a function of the position of the governing means including the levers 173 and 174 and the valve piston 179.

The dashpot 186 and the lever 188 serve to prevent overthrowing or hunting of the movable member 172. Assuming the movement of the piston 182 to be in the direction indicated by the arrow in Figure 1, the dashpot is moved by the cam block 184 to oscillate the lever 188 and vary the tension of the spring 192 to restrain movement of the movable member 172. When the said member 172 is actuated it either relieves or increases the tension on the spring 192 so that the lever 188 is oscillated by the tension of the spring 192 or the balancing springs 189, 190 according to the movement of the member 172. Movement of the member 172 in horizontal directions is thus restrained by the dashpot 186 and the piston 186$^b$, and also by the actuation of the dashpot 186 by the cam block 184 and the spring 185.

It will be understood that the apparatus shown and described is mainly for the purpose of illustrating the principles of the invention, and that the invention may be embodied in many other forms of apparatus without departing from the spirit or scope of the invention. Therefore, I do not desire to be understood as limiting myself except as required by the following claims when construed in the light of the prior art.

Having thus described the invention, what I claim is:

1. In a system of the character described, the combination with a device to be actuated by auxiliary energy in accordance with variations in a controlling system, of a member movable in accordance with said variations, periodically movable means, and governing means for controlling the application of auxiliary energy to said device, said governing means being periodically actuated by cooperation of said periodically movable means and said movable member to cause the continuous application of said auxiliary energy to said device quantitatively in accordance with the variations in said controlling system.

2. In a system of the character described, the combination with a device to be actuated by auxiliary energy in accordance with variations in a controlling system, of a governing means for causing continuous application of auxiliary energy to said device with quantitative variations in said energy, a periodically movable means for periodically actuating said governing means, and a member movable in accordance with said variations in said controlling system to cooperate with said periodically movable means and said governing means to vary the actuation of said governing means and cause quantitative variations in said auxiliary energy in accordance with the positions of said movable member.

3. In a system of the character described, the combination with a device to be actuated by auxiliary energy in accordance with variations in a controlling system, of movable governing means for causing continuous application of said auxiliary energy to said device and with quantitative variations according to the position of said governing means, a member movable in accordance with variations in a controlling system, and means to cooperate periodically with said movable member for varying the position of said movable governing means in accordance with the position of said movable member.

4. In a system of the character described, the combination of a member movable in accordance with controlling variations, a pilot motor to be actuated by auxiliary energy, a movable governing means to cause continuous application of auxiliary energy to said motor with quantitative variations as functions of the positions of said governing means, and means to cooperate periodically with said movable member for periodically varying the postion of said governing means in accordance with the position of said movable member.

5. In a system of the character described, the combination with a device to be actuated by auxiliary energy in accordance with variations in a controlling system, of movable governing means for causing continuous application of said auxiliary energy to said device so that the rate and the direction of actuation of said device is in accordance with the position of said governing means, a member movable in accordance with variations in a controlling system, and means to cooperate periodically with said movable member for varying the position of said movable governing means in accordance with the position of said movable member, whereby the rate and direction of actuation of said device is in accordance with the position of said movable member.

6. In a system of the character described, the combination with a device to be actuated by auxiliary energy in accordance with variations in a controlling system, of a governing means for causing continuous application of auxiliary energy to said device with quantitative variations in said energy, a movable member the directions of movement and the positions of which are constantly in accordance with said variations in said controlling system, and means to cooperate periodically with said movable member to actuate said governing means to cause variations in the direction and the extent of actuation of said device in accordance with the directions of movement and positions of said movable member.

7. In a system of the character described, the combination with a device to be actuated by fluid auxiliary energy in accordance with variations in a controlling system, of a member movable in accordance with said variations, periodically movable means, and fluid governing means for controlling the application of auxiliary energy to said device, said governing means being periodically actuated by cooperation of said periodically movable means and said movable member to cause the continuous application of said auxiliary energy to said device quantitatively in accordance with the variations in said controlling system.

8. In a system of the character described, the combination with a device to be actuated by fluid auxiliary energy in accordance with variations in a controlling system, of a fluid governing means for causing continuous application of auxiliary energy to said device with quantitative variations in said energy, a periodically movable means for periodically actuating said governing means, and a member movable in accordance with said variations in said controlling system to cooperate with said periodically movable means and said governing means to vary the actuation of said governing means and cause quantitative variations in said auxiliary energy in accordance with the positions of said movable member.

9. In a system of the character described, the combination with a device to be actuated by fluid auxiliary energy in accordance with variations in a controlling system, of movable fluid governing means for causing continuous application of said auxiliary energy to said device so that the rate and direction of actuation of said device is in accordance with the position of said governing means, a member movable in accordance with variations in a controlling system, and means to cooperate periodically with said movable member for varying the position of said movable governing means in accordance with the position of said movable member, whereby the rate and direction of actuation of said device is in accordance with the position of said movable member.

10. In a system of the character described, the combination with a device to be actuated by fluid auxiliary energy in accordance with variations in a controlling system, of a fluid governing means for causing continuous application of auxiliary energy to said device, with quantitative variations in said energy, a movable member the directions of movement and the positions of which are constantly in accordance with said variations in said controlling system, and means to cooperate periodically with said movable member to actuate said governing means to cause variations in the direction and the extent of actuation of said device in accordance with the directions of movement and positions of said movable member.

11. An automatic regulator, comprising a member movable in accordance with variations in a controlling system, a movable governing means for controlling the application of auxiliary energy continuously and according to the position of said movable governing means, a means to cooperate periodically with said movable member for varying the position of said movable governing means according to the position of said movable member, and means operating in accordance with the application of said auxiliary energy to prevent overthrowing or hunting of the regulator.

12. An automatic regulator, comprising a member movable in accordance with variations in a controlling sustem, a movable governing means for controlling the application of auxiliary energy continuously and as a function of the position of said movable governing means, a means to cooperate periodically with said movable member for varying the position of said movable governing means according to the position of said movable member, and means operating in accordance with the applying of said auxiliary energy to prevent overthrowing or hunting of the regulator.

13. An automatic regulator, comprising a member movable in accordance with variations in a controlling system, a pilot motor to be actuated by auxiliary energy, a movable governing means for controlling actuation of said pilot motor continuously by said auxiliary energy and according to the position of said movable governing means, a means to cooperate periodically with said movable member for varying the position of said movable governing means according to the position of said movable member, and means operating in accordance with said pilot motor to prevent overthrowing or hunting of the regulator.

14. An automatic regulator, comprising a member movable in accordance with variations in a controlling system, a pilot motor to be actuated by auxiliary energy, a movable governing means for controlling actuation of said pilot motor continuously by said auxiliary energy and as a function of the position of said movable governing means, a means to cooperate periodically with said movable member for varying the position of said movable governing means according to the position of said movable member, and means operating in accordance with said pilot motor to prevent overthrowing or hunting of the regulator.

15. An automatic regulator, comprising a member movable in accordance with variations in a controlling system, a movable governing means for controlling the application of fluid auxiliary energy continuously and according to the position of said movable governing means, a means to cooperate periodically with said movable member for varying the position of said movable governing means according to the position of said movable member, and means operating in accordance with the application of said auxiliary energy to prevent overthrowing or hunting of the regulator.

16. An automatic regulator, comprising a member movable in accordance with variations in a controlling system, a movable governing means for controlling the application of fluid auxiliary energy continuously and as a function of the position of said movable governing means, a means to cooperate periodically with said movable member for varying the position of said movable governing means according to the position of said movable member, and means operating in accordance with the applying of said auxiliary energy to prevent overthrowing or hunting of the regulator.

17. An automatic regulator, comprising a member movable in accordance with variations in a controlling system, a fluid pilot motor to be actuated by auxiliary energy, a movable governing means for controlling actuation of said pilot motor continuously by said auxiliary energy and according to the position of said movable governing means, a means to cooperate periodically with said movable member for varying the position of said movable governing means according to the position of said movable member, and means operating in accordance with said pilot motor to prevent overthrowing or hunting of the regulator.

18. An automatic regulator, comprising a member movable in accordance with variations in a controlling system, a fluid pilot motor to be actuated by fluid auxiliary energy, a movable governing means for controlling actuation of said pilot motor continuously by said auxiliary energy and as a function of the position of said movable governing means, a means to cooperate periodically with said movable member for varying the position of said movable governing means according to the position of said movable member, and means operating in accordance with said pilot motor to prevent overthrowing or hunting of the regulator.

ERICH ROUCKA.

Certificate of Correction.

It is hereby certified that in Letters Patent No. 1,515,173, granted November 11, 1924, upon the application of Erich Roucka, of Blansko, Czechoslovakia, for an improvement in "Automatic Regulators," errors appear in the printed specification requiring correction as follows: Page 1, lines 24 to 27, strike out the words " or another quantity or quality in accordance with variations in the first mentioned quality or quantity," and insert the same to follow after the word "quality" in line 28; page 2, line 66, for the word " forward " read *toward;* page 3, line 51, claim 4, for the misspelled word " postion " read *position;* page 4, line 43, claim 12, for the word " sustem " read *system;* and that the said Letters Patent should be read with these corrections therein that the same may conform to the record of the case in the Patent Office.

Signed and sealed this 6th day of January, A. D. 1925.

[SEAL.]

KARL FENNING,
*Acting Commissioner of Patents.*